2,842,504

HYDROGENATION CATALYST

Rufus V. Jones, Bartlesville, Okla., assignor to Phillips Petroleum Company, a corporation of Delaware No Drawing. Application August 23, 1954
Serial No. 451,702

4 Claims. (Cl. 252—430)

This invention relates to hydrogenation catalysts. In one of its more specific aspects it relates to a method for the protection of high activity nickel catalyst prepared for use in hydrogenation reactions. In another of its more specific aspects it relates to a novel hydrogenation catalyst capable of retaining its activity during long periods of storage.

In the hydrogenation of unsaturated compounds and particularly in the hydrogenation of rubbery polymers, metal catalysts are used. These metal catalysts and particularly nickel catalysts are prepared and used in a high state of activity.

The hydrogenation of rubbery polymers is usually carried out by charging a polymer, such as a butadiene polymer, substantially free of salts or other materials which might act as hydrogenation catalyst poisons, into a suitable hydrogenation reactor in the form of a solution or dispersion in a suitable medium.

After the polymer, dissolved in the solvent medium, has been introduced into the reactor, the hydrogenation catalyst is added, hydrogen is added, and the temperature raised to a suitable level so as to initiate the reaction. The reaction can be continuous or batch-wise. When sufficient hydrogenation has been effected, usually as indicated by a decrease in unsaturation or a drop in hydrogen pressure, the reaction is stopped and the solution treated by suitable means, such as by filtering, centrifuging, and the like, so as to remove the catalyst. Hydrogenated rubbery polymer is then separated from the solvent by suitable means such as evaporating the solvent from the polymer. The polymer can be recovered by spray drying or by drum drying so as to remove the solvent from the polymer.

Suitable solvents include saturated cyclic hydrocarbons such as cyclohexane, methylcyclohexane, decalin, and the like, preferably boiling above atmospheric temperature. Aromatic hydrocarbons, such as benzene and toluene; cyclic ethers, such as dioxane; and paraffinic hydrocarbons such as isooctanes, isopentanes, and normal heptane; hydro aromatic hydrocarbons such as tetralin; and the like, can also be used. Although any of the above solvents or a mixture of any of the above solvents can be employed in the hydrogenation of rubbery polymers, methylcyclohexane is the preferred solvent.

Each of the following objects is attained by at least one of the aspects of this invention.

It is an object of this invention to provide a method for preserving the activity of hydrogenation catalysts.

It is an object of this invention to provide a method for preserving the activity of nickel-kieselguhr hydrogenation catalysts.

Another object is to provide a nickel-kieselguhr catalyst coated with a hydrogenated rubbery polymer.

Another object is to provide an active hydrogenation catalyst capable of being handled and stored without loss of activity.

Another object of this invention is to provide a method of supplying a protective coating to a nickel-kieselguhr catalyst in the absence of atomspheric oxygen.

Other objects and advantages of this invention will be apparent to one skilled in the art upon reading this disclosure.

I have discovered that active nickel-kieselguhr hydrogenation catalysts can be coated with rubbery polymers and that such coated catalysts retain a high state of activity over a long period of time and that the coating can be easily and quickly removed when the catalyst is to be employed in the hydrogenation reaction.

Nickel-kieselguhr catalysts are preferred for the hydrogenation of rubbery polymers, however, other active catalysts, including Raney nickel, copper chromite, molybdenum sulfide, finely divided platinum, finely divided palladium, platinum oxide, chromium oxide and the like, can be used in such hydrogenation reaction. Thus catalysts which are composed of reduced metal or metallic compounds which are pyrophoric or otherwise adversely affected by oxygen can be protected by a coating of hydrogenated rubbery polymer of butadiene and catalysts so coated can be stored for extended periods of time with substantially no loss of activity.

The catalysts used in the hydrogenation reactions contemplated are well known and methods for their preparation are also well known. The nickel-kieselguhr catalysts preferred for the hydrogenation of rubbery polymers can be prepared by saturating kieselguhr with a reducible nickel compound such as nickel hydroxide after which at least a portion of the nickel compound in the mixture is reduced to elemental nickel in a stream of hydrogen at elevated temperature. The system can then be flushed with an inert gas such as nitrogen or carbon dioxide, if desired, or the hydrogen atmosphere maintained and the nickel-kiesselguhr catalyst is then quenched with a suitable solvent such as methylcyclohexane.

A nickel-kieselguhr catalyst having a particle size between 1 and 8 microns and which has been activated at a temperature between 500 and 800° F. for a period of several hours during which period hydrogen is passed thereover, is preferably employed in the hydrogenation of rubbery polymers to form thermoplastic material. The nickel-kieselguhr catalyst activated as hereinbefore described is in a state of high activity because such treatment reduces at least a part of the nickel compound to elemental nickel, generally 35 to 40 percent of the nickel being reduced, the reduced nickel content, however, sometimes varying from approximately 10 to 50 percent. The active, elemental nickel is pyrophoric and when exposed to oxygen undergoes instantaneous exothermic reaction to such an extent that it can be a fire hazard. Catalytic activity is lost immediately and thus a very definite problem exists in the preparation and handling of these highly active hydrogenation catalysts.

According to the practice of this invention, the catalyst prepared in the above outlined procedure can be preserved and prepared for storage by treating the catalyst in the following manner. The catalyst as prepared above is coated with a hydrogenated rubbery polymer by quenching the catalyst in the above quenching step with a solution of hydrogenated rubbery polymer dissolved in the quench solvent such as methylcyclohexane. It is important that the catalyst be introduced into such solution as quickly as possible after its preparation and in the absence of oxygen. The mixture of catalyst and hydrogenated rubbery polymer should be agitated or stirred sufficiently so as to intimately contact the catalyst and the dissolved hydrogenated rubbery polymer so that the particles of catalysts are completely coated with the polymer dissolved in the solvent. The mixture is then dried by any suitable means such as drum drying or spray drying. After drying, the catalysts is found to be coated with a film of hydrogenated rubbery polymer and the catalyst so coated can be stored until needed without substantial loss of catalytic activity. The thickness of the film upon the catalyst can be controlled by regulating the amount of hydrogenated rubbery polymer dissolved in the solvent which is used to quench the nickel-kieselguhr catalyst.

The polymers which can be used in the invention include unhydrogenated and hydrogenated polybutadiene, butadiene-styrene, isoprene-styrene copolymers and the like and mixtures of such unhydrogenated and hydrogenated polymers and copolymers. The unhydrogenated polymers should be solid and non-sticky, to the extent that coated particles of catalyst will not agglomerate to form a solid mass. The coated particles should remain freeflowing under normal storage conditions. Unhydrogenated rubbery polymers, such as polybutadiene, having a Mooney value above about 50 (ML-4) measured at 212° F. are generally satisfactory.

Polymers and copolymers having a Mooney value above about 15 can be hydrogenated so as to produce free-flowing coated catalyst by hydrogenating to 50 percent unsaturation or less. The unsaturation is based upon the theoretical value of 100 percent for the unhydrogenated polymer.

Unsaturation is conveniently determined by the iodine chloride addition method described by Lee, Kolthoff and Mairs in Journal of Polymer Science, volume 3 (1948), at pages 66 to 84.

Hydrogenated rubbery polymers are preferred to the unhydrogenated rubbery polymers for coating catalyst because they are more stable than unhydrogenated rubbery polymers and catalysts coated with hydrogenated rubbery polymers maintain their free-flowing characteristics over a longer period of time.

The amount of rubbery polymer to be used in coating a catalyst preferably will be in the range of 5 to 100 weight percent and more preferably 5 to 25 weight percent of rubbery polymer in the coated catalyst. In some cases where an extremely active catalyst is not necessary or where the period of storage is not long amounts of rubbery polymer can be as low as 0.01 weight percent of rubbery polymer in the coated catalyst.

A finely divided nickel-kieselguhr catalyst which has been coated properly with a rubbery polymer has the appearance of a coarse, free-flowing powder because individual particles or small groups of particles are coated with the polymer. A catalyst coated in this manner can be easily handled, packaged and stored with substantially no danger of breaking the seal of polymer which protects the catalyst.

When a catalyst, which has been coated according to the practice of this invention and stored until time for its use, is employed in the hydrogenation of rubbery polymers, the coating is readily dissolved and removed by the solvent in which the hydrogenation process takes place. The coated catalyst can be added to a solution of the polymer dissolved in a suitable solvent such as methylcyclohexane. If desired the polymer and coated catalyst can be added to the methylcyclohexane simultaneously or in any other order.

*Example I*

A nickel-kieselguhr catalyst was prepared in the following manner: Kieselguhr impregnated with nickel hydroxide was reduced by heating to 675° F. passing hydrogen over and/or through the nickel kieselguhr for a period of four hours. The catalyst was then allowed to cool to about room temperature in a hydrogen atmosphere and was then quenched in methylcyclohexane. The catalyst, when completely reduced, has a nickel content of 75 weight percent.

A hydrogenated polymer, for use as a catalyst coating, was prepared as follows:

A 16 Mooney polybutadiene, prepared by emulsion polymerization at 41° F. and dispersed in methylcyclohexane was charged to a hydrogenation reactor along with 0.25 part by weight of the above kieselguhr-nickel catalyst per part of polybutadiene and the reactor pressured to 500 p. s. i. g. with hydrogen. The temperature was then slowly raised to 400° F. and maintained at that level for 3 hours. The pressure was maintained at 500 p. s. i. g. by addition of hydrogen at 15 minute intervals.

The catalyst was removed from the resulting dispersion by filtration and discarded and the product recovered by evaporation of the methylcyclohexane. The hydrogenated polymer had an unsaturation value of 0.8 percent.

Several batches of the catalyst as prepared above were coated with varying amounts of hydrogenated rubbery polymer of butadiene in the following manner: Small amounts of the catalyst (2.35 grams) in methylcyclohexane were placed in each of five test tubes, and an additional 10 milliliters of methylcyclohexane was added to each tube. Small incremental amounts of a dilute solution of hydrogenated rubbery polymer of butadiene in methylcyclohexane solution were then added to each tube. The tubes were then stoppered and shaken for ten minutes, after which the contents were removed and spray dried. The data for these runs are tabulated below.

| Wt. of Catalyst, Grams | Ml. of MCH Added | Ml. Hydrogenated Rubbery Polymer Solution Added | Wt. of Hydrogenated Rubbery Polymer Added (grams) | Wt. Percent Hydrogenated Rubbery Polymer Present in Coated Catalyst Product |
|---|---|---|---|---|
| 2.35 | 10 | 15.0 | 0.288 | 12.2 |
| 2.35 | 10 | 1.0 | 0.019 | 0.8 |
| 2.35 | 10 | 0.1 | 0.0019 | 0.08 |

Several runs were made hydrogenating the unsaturated solid polybutadiene described above using the catalysts as prepared above. These catalysts contained varying amounts of hydrogenated rubbery polymer of butadiene as a coating. An uncoated catalyst sample, which had been stored in methylcyclohexane was also used in hydrogenating a butadiene polymer. The results of these runs are tabulated below.

| Grams Catalyst Used per Gram of Polymer | Time Elapsed Between Preparation and Use of Catalyst (Days) | Wt. Percent Hydrogenated Rubbery Polymer Present in Coated Catalyst Product | Percent Unsaturation of Final Hydrogenation Product |
|---|---|---|---|
| 0.1 | 18 | ¹ 0 | 14.2 |
| 0.1 | 21 | 12.2 | 16.4 |
| 0.1 | 21 | 0.8 | 27.2 |
| 0.1 | 19 | 0.08 | 28.0 |

¹ Catalyst stored in methylcyclohexane.

Variations and modifications are possible within the scope of the disclosure of the present invention, the essence of which is the discovery that rubbery polymers can be used to coat an active nickel hydrogenation catalyst so as to preserve its activity and that the coating can be quickly and easily removed for the hydrogenation reaction leaving the catalyst in active form.

That which is claimed is:

1. The method of preparing a free-flowing nickel hydrogenation catalyst in storable and usable form which comprises reducing a finely divided nickel compound catalyst which is adversely affected by oxygen, in an atmosphere of hydrogen; cooling said reduced catalyst in an atmosphere of hydrogen; directly introducing said catalyst into a solution containing a solvent selected from the group consisting of cyclohexane, methylcyclohexane, decalin, benzene, toluene, dioxane, isooctane, isopentane, normal heptane, and tetralin, and a sufficient amount so as to coat said catalyst with from 5 to 100 weight percent thereof of a rubbery polymer selected from the group consisting of unhydrogenated polymers of butadiene, unhydrogenated copolymers of butadiene-styrene, unhydrogenated copolymers of isoprene-styrene, said unhydrogenated polymers and copolymers having a Mooney value above about 50 (ML-4) measured at 212° F., hydrogenated polymers of butadiene, hydrogenated copolymers of butadiene-styrene and hydrogenated copolymers of isoprene-styrene prepared by hydrogenating the corresponding unhydrogenated compound having a Mooney value above about 15 (ML-4) measured at 212° F.; and drying the resulting mixture so as to remove said solvent and leave the finely divided catalyst coated with the rubbery polymer.

2. The method of preparing a free-flowing nickel hydrogenation catalyst in storable and usable form which comprises reducing a finely divided nickel compound catalyst which is adversely affected by oxygen in an atmosphere of hydrogen; cooling said reduced catalyst in an atmosphere of hydrogen; directly introducing said catalyst into a solution containing a sufficient amount of a hydrogenated rubbery polymer of butadiene in a solvent selected from the group consisting of cyclohexane, methylcyclohexane, decalin, benzene, toluene, dioxane, isooctane, isopentane, normal heptane, and tetralin, so as to coat said catalyst with from 5 to 100 weight percent, with respect to said catalyst, of said polymer; and drying the resulting mixture so as to remove said solvent and leave the finely divided catalyst coated with the hydrogenated rubbery polymer of butadiene.

3. The method of preparing a free-flowing nickel hydrogenation catalyst in storable and usable form which comprises reducing a finely divided nickel compound catalyst, which is adversely affected by oxygen, in an atmosphere of hydrogen; cooling said reduced catalyst in an atmosphere of hydrogen; directly introducing said catalyst into a solution containing a sufficient amount of a hydrogenated rubbery polymer of butadiene in methylcyclohexane so as to coat said catalyst with from 5 to 100 weight percent, with respect to said catalyst, of said polymer; and drying the resulting mixture so as to remove said methylcyclohexane and leave the finely divided catalyst coated with the hydrogenated rubbery polymer of butadiene.

4. In the method of preparing a nickel hydrogenation catalyst supported on kieselguhr wherein at least a portion of a nickel compound supported on said kieselguhr is reduced to elemental nickel in an atmosphere of hydrogen, the improvement which comprises cooling said reduced catalyst in an atmosphere of hydrogen; directly introducing said catalyst into a solution containing a sufficient amount of hydrogenated rubber polymer of butadiene dissolved in methylcyclohexane so as to coat said catalyst with from 5 to 100 weight percent, with respect to said catalyst, of said polymer; and drying the resulting mixture so as to remove said methylcyclohexane and leave the catalyst coated with the hydrogenated rubbery polymer of butadiene.

References Cited in the file of this patent

UNITED STATES PATENTS

| | | |
|---|---|---|
| 2,540,599 | Segura | Feb. 6, 1951 |
| 2,609,346 | Faulkner | Sept. 2, 1952 |
| 2,623,078 | Bewley | Dec. 23, 1952 |
| 2,692,892 | Hillyer et al. | Oct. 26, 1954 |
| 2,743,233 | Fischer | Apr. 24, 1956 |

UNITED STATES PATENT OFFICE
CERTIFICATE OF CORRECTION

Patent No. 2,842,504

July 8, 1958

Rufus V. Jones

It is hereby certified that error appears in the printed specification of the above numbered patent requiring correction and that the said Letters Patent should read as corrected below.

Column 2, line 35, for "nickel-kiesselguhr" read -- nickel-kieselguhr --; line 72, for "catalysts" read -- catalyst --; column 6, line 17, for "rubber" read -- rubbery --.

Signed and sealed this 25th day of November 1958.

(SEAL)
Attest:

KARL H. AXLINE
Attesting Officer

ROBERT C. WATSON
Commissioner of Patents